US009132752B2

(12) United States Patent
Pleskot (10) Patent No.: US 9,132,752 B2
(45) Date of Patent: Sep. 15, 2015

(54) ADJUSTING DEVICE, MOTOR VEHICLE SEAT, MOTOR VEHICLE AND METHOD FOR THIS (71) Applicant: GM GLOBAL TECHNOLOGY OPERATIONS LLC, Detroit, MI (US)

(72) Inventor: Andrzej Pleskot, Trebur (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/797,406

(22) Filed: Mar. 12, 2013

(65) Prior Publication Data

US 2013/0292985 A1  Nov. 7, 2013

(30) Foreign Application Priority Data

May 7, 2012  (DE) .......................... 10 2012 008 822

(51) Int. Cl.
*B60N 2/20*  (2006.01)
*B60N 2/235*  (2006.01)
*B60N 2/22*  (2006.01)
*B60N 2/60*  (2006.01)
*B60N 2/16*  (2006.01)

(52) U.S. Cl.
CPC ................ *B60N 2/22* (2013.01); *B60N 2/1615* (2013.01); *B60N 2/2356* (2013.01); *B60N 2/6009* (2013.01); *Y10T 29/49826* (2015.01)

(58) Field of Classification Search
USPC .................................. 297/361.1, 374, 463.1
See application file for complete search history.

(56) References Cited

U.S. PATENT DOCUMENTS

| 2,945,722 | A |   | 7/1960  | Horton |
|-----------|---|---|---------|--------|
| 3,115,328 | A |   | 12/1963 | Brown |
| 4,401,928 | A |   | 8/1983  | Kamijo et al. |
| 4,437,703 | A |   | 3/1984  | Nishikori et al. |
| 4,547,718 | A |   | 10/1985 | Ratzel et al. |
| 4,653,807 | A | * | 3/1987  | Hirose et al. .............. 297/367 R |
| 4,830,433 | A |   | 5/1989  | Takahashi |
| 4,836,606 | A |   | 6/1989  | Werner |

(Continued)

FOREIGN PATENT DOCUMENTS

CD  102005028352 B4  12/2006
DE       1630781 A1    3/1971

(Continued)

OTHER PUBLICATIONS

German Patent Office, German Patent Search Report for Application No. 102012008822.1, dated on Jan. 25, 2013.

(Continued)

*Primary Examiner* — Rodney B White
(74) *Attorney, Agent, or Firm* — Ingrassia Fisher & Lorenz PC (57) ABSTRACT

A motor vehicle including a motor vehicle seat with an adjusting device for the multiple adjusting of a motor vehicle seat is provided. In one example, a backrest adjusting device with a discontinuous detent fitting arrangement for adjusting a backrest part relative to a sitting part, including a detent fitting arrangement connected in a stationary manner with the sitting part via connecting means, and at least one actuating arrangement rotatable about at least one rotation axis for actuating the detent fitting arrangement is provided. The at least one rotation axis is constructed in an integrated manner with at least one of the connecting means, and a method for this is provided.

10 Claims, 2 Drawing Sheets

(56) References Cited

U.S. PATENT DOCUMENTS

| | | | |
|---|---|---|---|
| 6,599,527 B1 | 7/2003 | Takahashi | |
| 6,749,263 B2 | 6/2004 | Peters | |
| 6,874,855 B2 | 4/2005 | Nivet | |
| 7,862,121 B2* | 1/2011 | Ishijima et al. | 297/367 R |
| 7,938,490 B2* | 5/2011 | Ishijima et al. | 297/361.1 X |
| 7,959,229 B2* | 6/2011 | Ishijima et al. | 297/361.1 X |
| 7,997,655 B2 | 8/2011 | Sakai et al. | |
| 8,162,404 B2* | 4/2012 | Ueda | 297/463.1 |
| 8,353,561 B2* | 1/2013 | Yamazaki et al. | 297/452.38 |
| 8,678,507 B2* | 3/2014 | Yamazaki et al. | 297/463.1 |
| 2003/0080600 A1 | 5/2003 | Eppert | |
| 2005/0017562 A1 | 1/2005 | Lehmann et al. | |
| 2005/0264076 A1 | 12/2005 | Uramichi et al. | |
| 2006/0181130 A1 | 8/2006 | Kienke et al. | |
| 2007/0274616 A1 | 11/2007 | Schrimpl et al. | |
| 2009/0021062 A1 | 1/2009 | Lehmann | |
| 2009/0026791 A1* | 1/2009 | Ishijima et al. | 297/361.1 X |
| 2009/0026816 A1 | 1/2009 | Haller | |
| 2009/0026825 A1* | 1/2009 | Ishijima et al. | 297/358 |
| 2009/0058158 A1* | 3/2009 | Sobieski | 297/338 |
| 2010/0109406 A1* | 5/2010 | Ueda | 297/358 |
| 2011/0101756 A1 | 5/2011 | Fassbender et al. | |
| 2013/0291676 A1 | 11/2013 | Pleskot et al. | |
| 2014/0110984 A1 | 4/2014 | Assman et al. | |

FOREIGN PATENT DOCUMENTS

| | | |
|---|---|---|
| DE | 2364755 A1 | 8/1974 |
| DE | 8321195 U1 | 10/1983 |
| DE | 19616680 A1 | 11/1997 |
| DE | 19916179 A1 | 10/2000 |
| DE | 10048270 A1 | 4/2002 |
| DE | 10145746 A1 | 4/2003 |
| DE | 10009228 B4 | 2/2004 |
| DE | 10310424 A1 | 9/2004 |
| DE | 102004010592 A1 | 3/2005 |
| DE | 102004012383 B3 | 6/2005 |
| DE | 102004056086 B3 | 1/2006 |
| DE | 102006032681 A1 | 1/2007 |
| DE | 102006030239 B3 | 12/2007 |
| DE | 202008001597 U1 | 6/2009 |
| DE | 102008028475 A1 | 11/2009 |
| DE | 102008059515 B3 | 7/2010 |
| DE | 202010015093 U1 | 1/2011 |
| DE | 102010018786 A1 | 10/2011 |
| DE | 202011106338 U1 | 11/2011 |
| DE | 102010025112 A1 | 12/2011 |
| DE | 102011083082 A1 | 3/2012 |
| DE | 102012003755 A1 | 8/2013 |
| EP | 1470949 A1 | 10/2004 |
| EP | 1524146 A1 | 4/2005 |
| EP | 1775155 A2 | 4/2007 |
| EP | 2243657 A1 | 10/2010 |
| GB | 2207044 A | 1/1989 |
| GB | 2501981 A | 11/2013 |
| WO | 2004062961 A1 | 7/2004 |
| WO | 2011160771 A1 | 12/2011 |

OTHER PUBLICATIONS

German Patent Office, German Patent Search Report for Application No. 102012007978.8, dated on Dec. 21, 2012.

UK IPO, British Search Report for Application No. 1305460.6, dated Sep. 5, 2013.

UK IPO, British Search Report for Application No. 1305449.9, dated Sep. 9, 2013.

USPTO, Non-final Office Action for U.S. Appl. No. 13/797,424, mailed Dec. 23, 2014.

Search Report dated Sep. 24, 2013 for GB 1035455.6.

USPTO, Final Office Action for U.S. Appl. No. 13/797,424, mailed Apr. 9, 2015.

* cited by examiner

ADJUSTING DEVICE, MOTOR VEHICLE SEAT, MOTOR VEHICLE AND METHOD FOR THIS

CROSS-REFERENCE TO RELATED APPLICATION

This application claims priority to German Patent Application No. 10 2012 008 822.1, filed May 7, 2012, which is incorporated herein by reference in its entirety.

TECHNICAL FIELD

The technical field relates to an adjusting device for the multiple adjusting of a motor vehicle seat, in particular a backrest adjusting device with a discontinuous detent fitting arrangement for adjusting a backrest part relative to a sitting part. The technical field further relates to a motor vehicle seat, in particular a motor vehicle seat with an adjustable sitting part and a backrest part which is adjustable with respect to the sitting part. The technical field also relates to a motor vehicle. In addition, the technical field relates to a method for mounting a motor vehicle seat with an adjusting device for the multiple adjusting of the motor vehicle seat, in particular with a backrest adjusting device with a discontinuous detent fitting arrangement for adjusting a backrest part relative to a sitting part.

BACKGROUND

Motor vehicles with seats are known from the prior art, in which a motor vehicle seat is adjustable and is also multiply adjustable. In particular, it is known in motor vehicle seats to adjust a sitting part and a backrest or backrest part with respect to the sitting part. The sitting part or respectively the motor vehicle seat can be adjusted here on the one hand vertically, i.e. the sitting part can be spaced differently with respect to a vehicle floor. On the other hand, the backrest can be adjusted in relation to the sitting part with regard to an angle to the sitting part, i.e. the backrest is able to be folded in relation to the sitting part with respect to the latter about a rotation axis. Various mechanisms are known for this adjustment. The mechanisms are activated for adjusting via in each case an operating or actuating arrangement. In the known solutions, the operating arrangement for vertical adjustment is situated to the side of the sitting part. The operating arrangement for adjusting the backrest is situated in the region of the rotation axis, about which the backrest is able to be folded or pivoted, laterally adjacent to the backrest. Both actuating arrangements are therefore arranged spaced apart from one another. For the remote operation of an adjusting of the backrest relative to the sitting part, it is known to arrange an operating arrangement spaced apart with respect to a rotation axis, and to connect the operating arrangement by a Bowden cable with the rotation axis—directly or indirectly via a transmission unit. In the known solutions, the operating unit comprises a rotary lever, which is rotatably mounted, spaced apart with respect to the rotation axis.

The adjusting of the backrest takes place via a lever mechanism arranged on the seat or another actuating arrangement secured there. Continuous adjustments by means of actuators, and discontinuous adjustment, i.e. incremental adjustment by means of mechanical solutions, are known here. In the case of the mechanical adjustments, for an adjusting, a locking or arresting of the adjustment is to be released for adjusting and to be locked for arresting. This takes place via a lever, via which a force is transmitted to a detent fitting. The rotation axis, about which the backrest part is able to be folded, is defined or determined by the detent fitting, so that this rotation axis is also designated as detent fitting axis. A force transmission takes place proportionally, i.e. a force which is to be transmitted increases with the lever stroke or respectively on a rotary movement the torque increases with the torsion angle. Owing to intermediate positions of the detent fittings, an adjusting is already possible when the detent fitting is not completely unlocked. On an adjusting in intermediate positions, undesired secondary effects occur, such as noise development during adjusting, or increased wear.

From DE 38 00 924 C2 a vehicle seat with an adjusting device for a backrest is known, consisting of a stationary bearing block, a pivot arm pivotably mounted on the bearing block, which pivot arm is fastened on the backrest and is able to be secured in selectable angle positions by means of a locking arrangement, wherein the adjusting device is covered in the direction of the seat user by a covering part, characterized in that the bearing block is fastened on the sitting part and the remaining parts of the adjusting device are arranged within the backrest and are connected therewith, and that the covering part is securely connected with a part of the adjusting device and has a slit into which an upwardly projecting region of the bearing block dips on folding the backrest forward.

The actuating device for the known adjusting device is arranged directly on the seat which is to be adjusted, in the region of the rotation axis. The arrangement of the actuation is unergonomic and in cramped conditions is only able to be accessed with difficulty. In addition, an adjustment characteristic of the adjusting device is unfavorable for the user. For an operation of the seat adjustment, a grasping around by the user or respectively users is necessary.

In addition, other objects, desirable features and characteristics will become apparent from the subsequent summary and detailed description, and the appended claims, taken in conjunction with the accompanying drawings and this background.

SUMMARY

Accordingly, the present disclosure provides a solution which ensures a simpler and more comfortable possibility for adjustment. In particular, the present disclosure provides a motor vehicle, a motor vehicle seat, an adjusting device and a method for this, in which the operating comfort for adjusting a seat is improved.

The present disclosure includes that in an adjusting device for the multiple adjusting of a motor vehicle seat, in particular in a backrest adjusting device with a discontinuous detent fitting arrangement for adjusting a backrest part relative to a sitting part, comprising a detent fitting arrangement connected in a stationary manner and/or in a torque-proof manner with the sitting part via connecting means, and at least one actuating arrangement, rotatable about at least one rotation axis, for actuating the detent fitting arrangement, provision is made that the at least one rotation axis is constructed so as to be integrated with at least one of the connecting means.

The adjusting device is constructed for adjusting the motor vehicle seat. In particular, the adjusting device is constructed for adjusting the backrest relative to the sitting part of the motor vehicle seat. In one embodiment, the adjusting device is also constructed for the vertical adjustment of the motor vehicle seat. The adjusting device is generally constructed as a mechanical adjusting device. For an adjusting of the backrest or respectively of the backrest part, the adjusting device comprises a backrest adjusting device for adjusting the backrest part or respectively the backrest position. For adjusting the sitting part of the motor vehicle seat, the adjusting system comprises a device for adjusting the seat position, abbreviated as seat adjusting device. The adjusting devices are generally constructed separately from one another, in particular so as to be actuatable separately from one another. Each adjusting device is actuatable separately on its own via the corresponding actuating arrangement. In order to actuate the adjusting devices or respectively to initiate the adjusting, each of the adjusting devices has at least one actuating arrangement or one operating unit.

The actuating arrangement generally comprises a lever, a knob, a push-button, a grip or suchlike, which the user can grip and/or actuate. Generally, the adjusting devices have in each case a lever-like actuating arrangement. The actuating arrangement of the adjusting device for adjusting the sitting part, abbreviated to seat operating unit or seat actuating arrangement, is arranged in the region to the side of the sitting part adjacent to the seat adjusting device for adjusting the seat. The seat adjusting device comprises a mechanism by which a distance of the sitting part from a motor vehicle floor can be altered or respectively adjusted, more precisely a seat adjusting mechanism. The seat actuating arrangement is constructed as a lever, which is coupled with the mechanism, generally is connected directly, for example via a lever arm, for example a rod or suchlike.

The actuating arrangement of the backrest adjusting device for adjusting the backrest or the backrest part, also abbreviated to backrest operating unit or backrest actuating arrangement, is arranged remote or spaced apart from a region to the side of the backrest. The backrest adjusting device comprises a mechanism by which a locking of the backrest relative to the sitting part can be released or respectively locked. In an unlocked state, the backrest or respectively the backrest part is pivotable about the rotation axis or detent fitting axis relative to the sitting part, so that a backrest position can be adjusted. Accordingly, the backrest adjusting device comprises a detent fitting arrangement. The backrest actuating arrangement is constructed as a lever which is coupled with the corresponding backrest adjusting mechanism, for example a gear.

In order to avoid a grasping around of a user for the multiple adjusting of the motor vehicle seat, the backrest actuating arrangement is arranged adjacent to the seat actuating arrangement. The region in which a user actuates the respective actuating arrangement, in particular grasps towards for actuating, is designated as the grip region. According to the present disclosure, the actuating arrangements form, through their adjacent arrangement, a single, shared grip region. This means that the user moves his hand in the direction of the grip region. Within the shared grip region, the user selects which lever or respectively which actuating arrangement he wishes to operate without, in so doing, at least substantially altering the position of his hand. Generally, the movement of a finger of the hand is sufficient, in order to carry out or respectively alter the selection of the actuating arrangement. The actuating arrangements are arranged adjacent to one another. In one embodiment, the actuating arrangements have a gap between them here for better differentiation, so that a selection is facilitated. The gap has a gap measurement which is smaller than about 5 cm, generally smaller than about 4 cm, more generally smaller than about 3 cm, in one example smaller than about 2 cm, and in another example, smaller than about 1 cm. In one embodiment, the grip region is accordingly defined as an envelope around the actuating arrangements, in which a hand is situated on gripping or actuating the actuating arrangements. In one embodiment, the different actuating arrangements are constructed identically. Generally, for better differentiation, the actuating arrangements are constructed differently. Generally, the actuating arrangements form at least visually a single, shared unit.

The backrest adjusting device generally comprises at least one force transmission arrangement, by which a force for locking and unlocking the backrest adjusting device, more precisely at least one detent fitting arrangement of the backrest adjusting device, is able to be transmitted to the detent fitting arrangement. An adjusting of a backrest or of the backrest part takes place by applying force onto the backrest. The backrest is generally pre-stressed here, so that a pre-stressing force acts in the direction of an upright sitting position and contrary to a pivoted-back position. In order to pivot the backrest, a force is generally exerted by a user sitting on the seat, in one example, by leaning against the backrest.

So that an unintentional adjusting of the backrest is prevented, the backrest adjusting device comprises a locking device or arresting arrangement, which prevents the unintentional adjusting. The arresting arrangement is generally constructed as a detent fitting arrangement, in which two detent fitting parts act with one another. These are to be unlocked for an adjustment, so that a seat adjustment can take place. The backrest adjusting device comprises the detent fitting arrangement. On a locking, the two detent fitting parts are in engagement. In order to enable an adjusting, the detent fitting parts are moved apart, so that they are no longer in engagement. The force necessary for this, or respectively the movement for this is transmitted via the force transmission arrangement. On a relative movement of the two detent fitting parts, various intermediate positions exist between the two end positions or end states, locking and release, during the moving apart. In some of these intermediate positions, an adjusting is possible, although the detent fitting parts are still slightly in engagement.

In order to move the detent fitting parts apart, the force transmission arrangement is provided, by which a force for locking and unlocking is able to be transferred at least to the detent fitting arrangement. The force results here accordingly in a relative movement of the detent fitting parts. In order to use a force, which is transmitted via the power transmission arrangement to the detent fitting arrangement, so that an adjusting takes place only on a complete moving apart of the detent fitting parts, a force translation arrangement is provided. The force transmission arrangement is constructed to carry out the state in which the detent fitting parts are completely distanced from one another and an adjusting is to be carried out without contact of the detent fitting parts, more quickly and with a noticeable feedback to the user. For example, the force translation arrangement and the force transmission arrangement are constructed as a gear.

The detent fitting arrangement is connected on the one hand in a stationary manner with the sitting part with a first detent part. The detent fitting arrangement is connected with the backrest part with another detent part. The detent parts can be formed in an integrated manner with the respective corresponding part. The stationary or respectively torque-proof arrangement of the first detent part with the sitting part takes place via suitable connecting means. In one embodiment, the first detent part is connected with the sitting part via two screw connections which are spaced apart from one another. In other exemplary embodiments, other connecting means are provided, for example rivet connections or suchlike. In addition, the adjusting device has a rotation axis, in order to arrange the actuating arrangement rotatably thereon. The rotation axis is generally constructed in an integrated manner with one of the connecting means. Generally, the rotation axis is constructed aligned and/or in extension to a connecting means, for example a screw. In this way, through the connecting means on the one hand a stationary connection is realized, an on the other hand a rotatable connection.

Accordingly, in one embodiment provision is made that the connecting means are constructed as screw connecting means. These comprise a screw, which is able to be screwed with a threaded shaft in axial direction into a corresponding threaded opening.

In addition, one embodiment makes provision that at least one screw connecting means has a thread-free shaft for forming the rotation axis. The thread-free shaft is generally constructed aligned or concentrically to the threaded shaft. The screw connection or the screw connecting means has the threaded shaft here on one side and the thread-free shaft or respectively the rotation axis on another side. Between the two shafts, generally a rotationally asymmetrical section is formed, in one example, in the form of a screw head, for example in the form of a hexagon, in order to enable a screwing in of the screw connecting means with a corresponding spanner.

One embodiment makes provision that the actuating arrangement has a gear which is rotatable about the rotation axis. In order to ensure a space-saving actuation of the backrest adjusting device, the latter is provided with a gear which is rotatable about the rotation axis. By means of the gear, in addition a force transmission and/or a force translation is realized.

Accordingly, in one embodiment the gear has a lever unit, which is mounted by a first end rotatably about the rotation axis. Therefore, the lever unit is rotatable about the rotation axis, constructed with the connecting means, about a fastening point of the adjusting device on the sitting part.

In one exemplary embodiment, the lever unit has a second end with a grip part. The grip part is generally shaped ergonomically, in order to increase an operating comfort.

In addition, one embodiment makes provision that the gear has a cam, which is connected at a first end in a torque-proof manner with the lever unit. Via the lever unit and the cam, the actuating arrangement is able to be arranged remote from a detent fitting axis. The lever unit and the cam connected therewith enable a suitable force translation and/or force transmission from the lever unit to the detent fitting arrangement.

Accordingly, one exemplary embodiment makes provision that the gear has a detent fitting lever which is rotatable about a detent fitting axis, in order to rotate the detent fitting axis via this and to thus release or lock the detent fitting arrangement. The detent fitting arrangement is able to be actuated by means of the detent fitting lever. For this, the detent fitting lever is arranged by one end on the detent fitting axis, in particular is arranged in a torque-proof manner. The other end of the detent fitting lever projects radially away from the detent fitting axis. In so doing, the detent fitting lever forms a lever arm for a force transmission or respectively force translation.

One embodiment makes provision that the cam has a rolling part, in order to roll along the detent fitting lever. The rolling part is mounted rotatably on the cam. For example, the rolling part is constructed as a roller bearing or suchlike. In one exemplary embodiment, the rolling part is constructed as a bush which is rotatable about a cylinder pin. The axis about which the rolling part is rotatably mounted is arranged, generally in a torque-proof manner, on the cam. Generally, the rolling part is arranged remote from the rotation axis on the cam.

Accordingly, one embodiment provision is made that the detent fitting lever has a rolling surface corresponding to the rolling part. So that the rolling part and the detent fitting lever cooperate in an optimum manner, the detent fitting lever has a corresponding rolling surface. An optimized rolling of the rolling part is realized over the rolling surface. The rolling part is not arranged here at a fixed distance from the rolling surface. Rather, a distance of the rolling part from the rolling surface is variable.

In one exemplary embodiment, provision is made that the detent fitting lever is pre-stressed, so that the latter is able to be moved back into an initial position. A corresponding spring unit, for example a torsion spring or suchlike, is provided for the pre-stressing.

One embodiment makes provision that the actuating device has a movement limitation, in order to limit its movement. For example, the movement limitation has a groove in the cam, which cooperates with a stationary pin projecting into the groove. Therefore, the pin and groove limit a movement of the cam.

In one embodiment, provision is made that the actuating arrangements adjoining one another adjoin one another at least partially in alignment and/or flush. In one embodiment, provision is made that at least one of the surfaces of an operating unit of the actuating arrangements, for example a grip, a grip part, an end of the lever unit or suchlike, is arranged aligned at least to a corresponding surface of another operating unit. In particular, the surfaces facing the interior of the motor vehicle and/or the surfaces of the operating units or actuating arrangements which are visible to the user are aligned and/or arranged flush to one another, so that visually the impression of a single actuating arrangement or operating unit is produced. In a region not facing the user, the surfaces are, for example, constructed differently, so that these differ from one another haptically and/or are able to be differentiated haptically by the user. In an embodiment, all surfaces of the operating arrangements are aligned and/or arranged flush to one another. In one embodiment, markings, in particular haptic and/or non-visual markings, are provided for the differentiation of the actuating arrangements. In an embodiment, the actuating arrangements or respectively operating units have recessed grips and/or depressions or respectively integral shapings for better operability. Generally, the actuating arrangements are constructed aligned in a longitudinal direction of a motor vehicle.

In one embodiment, provision is made that the actuating arrangements are uncoupled from one another, so that the actuating arrangements are able to be operated separately from one another. Generally, a gap with a predetermined gap measurement is provided between the actuating arrangements, which does not intrusively impair the visual impression of an actuating arrangement which is constructed in a shared manner. Generally, the actuating arrangements are shaped ergonomically. In particular, the actuating arrangements have a slight curvature. The actuating arrangements are generally arranged rotatably about different rotation axes.

Another exemplary embodiment makes provision that the actuating arrangements are arranged in the region of the seat adjusting device, more precisely in the region of the seat actuating arrangement. The seat position adjustment or seat adjusting device is arranged in the lateral region to the sitting part, so that a user grasps laterally past the sitting part in order to actuate the seat adjusting device. The grip region is therefore constructed in the region of the seat adjusting device. More precisely, the shared grip region therefore corresponds to the grip region of the seat actuating arrangement.

In one embodiment, provision is made that at least the backrest actuating arrangement is arranged between the seat actuating arrangement and a seat adjusting mechanism of the seat adjusting device coupled with the seat actuating arrangement. The seat actuating arrangement is coupled directly with the seat adjusting mechanism, for example via a rod or suchlike. The backrest actuating arrangement is arranged at least partially between the seat actuating arrangement and the seat adjusting mechanism. In this way, a small installation space is ensured for the actuating arrangements.

Accordingly, an embodiment makes provision that a grip part of the backrest actuating arrangement is arranged in a mount of the grip part of the seat actuating arrangement. The recess is generally constructed so that the backrest actuating arrangement is arranged flush and/or aligned with the seat actuating arrangement. Laterally, generally in the direction of the sitting part, the recess is open so that a connection of the backrest actuating arrangement with the remaining backrest adjusting device is connected here. By the connection lying on the inside, an overall visual impression is not negatively impaired.

The present disclosure further includes that in a motor vehicle seat, in particular a motor vehicle seat with an adjustable sitting part and a backrest part which is adjustable with respect to the sitting part, comprising at least one adjusting arrangement for adjusting the backrest part and/or the sitting part, provision is made that the adjusting arrangement is constructed as the adjusting device described above. The adjusting device comprises at the lateral region in each case a detent fitting arrangement. These are coupled with one another via the shared detent fitting axis. The backrest part is able to be folded relative to the sitting part about the detent fitting axis.

In one embodiment, the motor vehicle seat is constructed as a single seat. In another embodiment, the motor vehicle seat is constructed as a bench seat. In an embodiment, the bench seat has divided backrest, which can be adjusted, via an adjusting device described above, individually and/or jointly. A part of the force transmission arrangement close to the detent fitting is constructed on the motor vehicle seat. The part of the force transmission unit remote from the detent fitting is arranged spaced apart from the part close to the detent fitting, generally in a grip region of the seat actuating unit.

In addition, the present disclosure includes a motor vehicle, in particular a passenger motor vehicle, comprising at least one seat unit for a vehicle occupant, provision is made that the seat unit is constructed as a motor vehicle seat described above. The motor vehicle is generally constructed as a passenger motor vehicle, comprising at least one seat unit for a vehicle occupant. The motor vehicle is constructed for example as a limousine, station wagon, coupe, sport-utility vehicle, (mini)bus or suchlike.

The present disclosure further includes a method for mounting a motor vehicle seat with an adjusting device for the multiple adjusting of the motor vehicle seat, in particular with a backrest adjusting device with a discontinuous detent fitting arrangement for adjusting a backrest part relative to a sitting part, comprising connecting the detent fitting arrangement with the sitting part via connecting means, so that the detent fitting arrangement is connected in a stationary manner with the sitting part, and constructing a rotation axis for the rotatable arranging of an actuating arrangement for actuating the detent fitting arrangement about the rotation axis, provision is made that the rotation axis is constructed in an integrated manner with at least one of the connecting means. The detent fitting arrangement has a part on the backrest side and a part on the sitting side. The part on the backrest side is connected in a stationary manner and/or in a torque-proof manner with the backrest part. The part on the sitting side is connected in a stationary manner and/or in a torque-proof manner with the sitting part. The part on the backrest side is rotatable relative to the part on the sitting side, in particular discontinuously rotatable.

The adjusting of a seat position of the motor vehicle seat comprises actuating the seat actuating arrangement and/or actuating the backrest actuating arrangement for adjusting the motor vehicle seat, wherein the actuating is carried out in a shared grip region. For actuating the actuating arrangements, the user moves his hand into a shared grip region of the seat actuating arrangement and the backrest actuating arrangement. Without leaving the grip region, the user selects the respective actuating arrangement which is to be operated. The backrest actuating arrangement is drawn in the direction of the user for adjusting the backrest. Hereby, the backrest adjusting device is unlocked, so that the user can adjust the backrest against a pre-stressing. The seat actuating arrangement is either drawn to the user or pressed by him in the direction of the vehicle floor. Hereby, a corresponding force and/or movement is transmitted to the seat adjusting mechanism of the seat adjusting device. According to the actuation, this raises or lowers the sitting part in relation to the motor vehicle floor. Both actuating arrangements are reset into an initial state after actuation.

In an embodiment, provision is made that a force transmission on actuating the backrest actuating arrangement is carried out by means of a translation unit to a rotation axis, in particular the detent fitting axis, of the backrest adjusting device for adjusting the backrest position.

On the adjusting of the backrest position of the motor vehicle seat by means of a discontinuous backrest adjusting device, a force for locking and unlocking a detent fitting arrangement of the backrest adjusting device is transmitted to the detent fitting arrangement by means of a force transmission arrangement. Provision is made that the transmitting comprises at least interim translating, in particular variable translating, of the force which is to be transmitted by the force transmission arrangement. The transmitting takes place to a part via a gear, generally a linkage and/or cam mechanism. In order to create a moment of a complete uncoupling of the detent fitting arrangement so as to be distinctly noticeable for a user, provision is made to translate the force transmission at least in the interim, so that at least a change occurs in a force-path course. In particular, provision is made that the force which is to be applied for a releasing of the adjusting device noticeably decreases at the moment of complete uncoupling of the detent fitting parts. Accordingly, the translation is carried out so that a resistance noticeably decreases as soon as the uncoupling moment is reached.

In particular, therefore, an embodiment makes provision that the translating comprises at least partially a degressive translating. Hereby, a linear force-path course or a rising force-path course, on initiation of the degressive translation, has a descending course.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIGS. 1 to 9 show in various views and various degrees of detailing an embodiment of a motor vehicle seat 1 with an adjusting device 100. The adjusting device 100 comprises a backrest adjusting device 100a. The example embodiment which is illustrated here further comprises a seat adjusting device 100b. The motor vehicle seat 1 comprises a backrest part 10 or also a backrest part and a seat part 20. The supporting structures of the parts 10, 20 are illustrated here without upholstery, for better understanding. The backrest part 10 and the sitting part 20 are connected so as to be able to be folded with respect to or respectively with one another via the adjusting device 100 which is constructed here as a backrest adjusting device 100a. The sitting part 20 is connected with a seat adjusting device 100b for the vertical adjustment of the sitting part 20. The adjusting device 100 has, accordingly, an operating arrangement or actuating arrangement 110, more precisely an operating arrangement or actuating arrangement 110a, 110b respectively for each of the adjusting devices 100a, 100b. The backrest adjusting device 100a comprises a backrest actuating arrangement 110a. The seat adjusting device 100b comprises a seat actuating arrangement 110b. The mode of operation and the components of the adjusting device 100 are described in detail below. The same reference numbers are used here for identical or similar components. An extensive description of components which have already been described is dispensed with, for reasons of clarity.

Figures 1, 2, 3, 4:
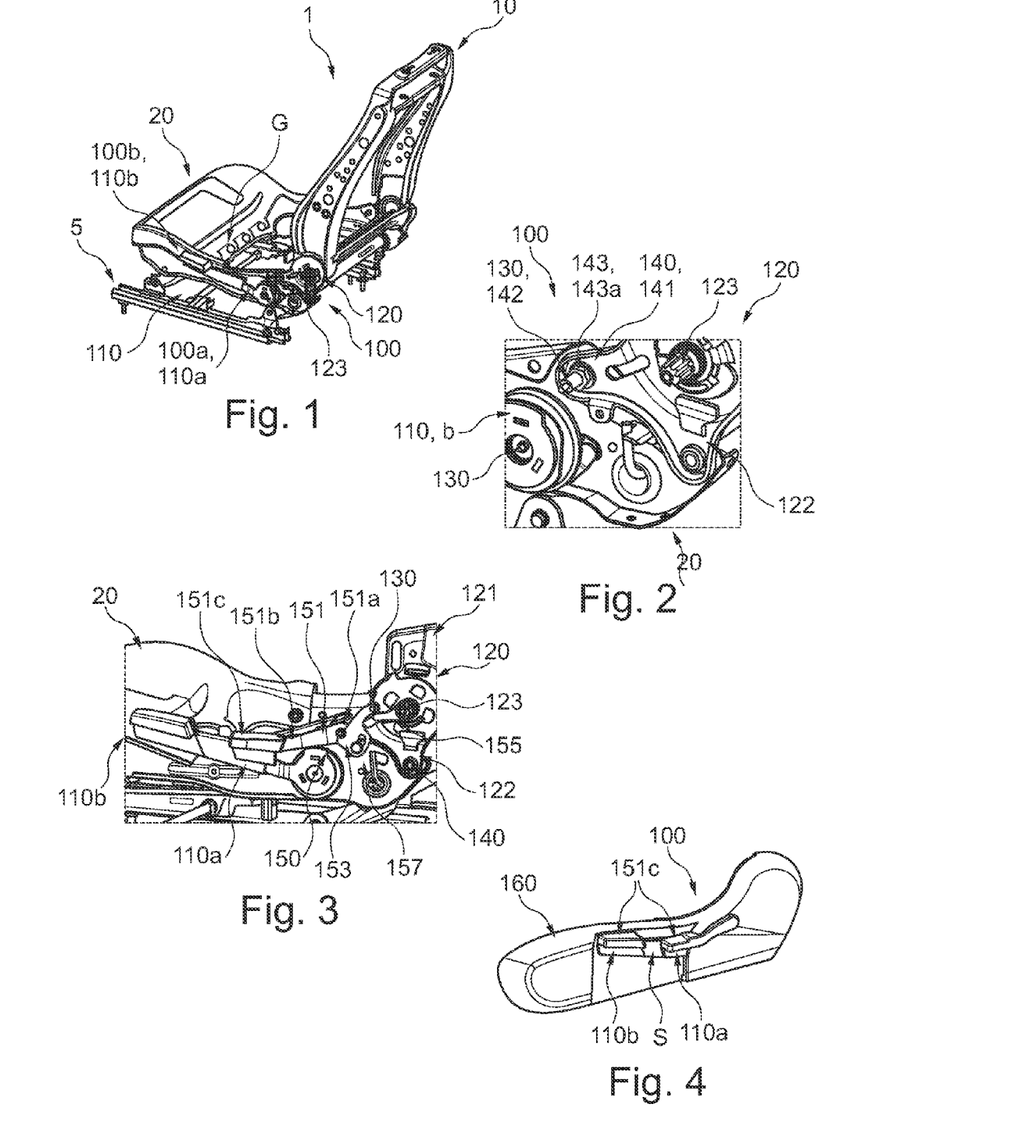
FIG. 1 is diagrammatically in a perspective view a motor vehicle seat without upholstery with an adjusting device.
FIG. 2 is diagrammatically in a perspective view a cutout of the adjusting device according to FIG. 1.
FIG. 3 is diagrammatically in another perspective view another cutout of the adjusting device according to FIG. 1.
FIG. 4 is diagrammatically in a perspective view a covered adjusting device.

FIG. 1 shows diagrammatically in a perspective view a motor vehicle seat 1 without upholstery, with an adjusting device 100. The adjusting device 100 comprises a backrest adjusting device 100a and a seat adjusting device 100b. The adjusting device 100 has here an actuating arrangement 110, a backrest actuating arrangement 110a for the backrest adjusting device 100a and a seat actuating arrangement 110b for the seat adjusting device 100b. The two actuating arrangements 110a, 110b are arranged adjacent to one another and are illustrated respectively in an initial state. The two illustrated actuating arrangements 110a, 110b are arranged here in a shared grip region G of a user. The grip region G corresponds to the region which a hand of a user takes up in order to actuate the actuating arrangements 110a, 110b. In the illustrated embodiment, the actuating arrangements 110a, 110b are arranged in a grip region G of the seat actuating arrangement 110b. This means that the position of the actuating arrangements 110a, 110b is arranged laterally in the region of the sitting part 20, more precisely laterally adjacent to the sitting part 20.

The adjusting device 100 further comprises a detent fitting arrangement 120. The detent fitting arrangement 120 is constructed as a discontinuous detent fitting arrangement 120. The backrest part 10 is connected so as to be foldable with the sitting part 20 via the detent fitting arrangement 120. For this, the detent fitting arrangement 120 has a part 121 on the backrest side and a part 122 on the sitting side. The part 121 on the backrest part is connected with the backrest part 10. The part 122 on the sitting side is connected with the sitting part 20. The two parts 121, 122 are constructed as detent fittings, which in the released state enable a relative movement with respect to one another and in the locked state lock the relative movement. The two parts 121, 122 are connected with one another rotatably about a detent fitting axis 123. For actuating the detent fitting arrangement 120, the latter is coupled with the actuating arrangement 110, more precisely the backrest actuating arrangement 110a. Accordingly, the backrest actuating arrangement 110a is also mounted rotatably. A rotation axis 130 is provided for the rotatable bearing. The rotation axis 130 is arranged spaced apart from the detent fitting axis 123. The two axes 123, 130 are aligned here parallel to one another.

The seat actuating arrangement 110a is also arranged rotatably about an axis, which is not illustrated explicitly here for reasons of clarity.

The motor vehicle seat 1 is movable in the direction of a motor vehicle longitudinal axis via a track system 5, which is arranged on a motor vehicle floor (not illustrated here).

The part 122 of the detent fitting arrangement 120 on the sitting side is connected in a stationary and torque-proof manner with the sitting part 20 via connecting means 140. The structure of the adjusting device 100 will emerge in more detail from the description concerning the further figures.

FIG. 2 shows diagrammatically in a perspective view a cutout of the adjusting device 100 according to FIG. 1. The part 122 of the detent fitting arrangement 120 on the sitting side is connected with the sitting part 20 here via two connecting means 140 constructed as screw connecting means 141. The rotation axis 130 of the backrest actuating arrangement 110a is constructed so as to be integrated here into one of the connecting means 140, here the upper, left-hand screw connecting means 141. This means that the corresponding screw connecting means 141 is constructed in one piece with the rotation axis 130. For this, the screw connecting means 141 has a thread-free shaft 142 functioning as rotation axis 130. The shaft 142 extends axially outwards from the screw connecting means 141. In addition, the screw connecting means 141 has a threaded shaft, which is concealed here by the sitting part 20 or respectively the part 122. A screwing section 143 is constructed between the opposite shafts, here in the form of a hexagonal screw head 143a, with which the screw connecting means 141 can be screwed. In FIG. 2 the backrest actuating arrangement 110a is not further illustrated. The structure of the adjusting device 100 with the actuating arrangements 110 is illustrated in the larger cutout according to FIG. 3.

FIG. 3 shows diagrammatically in another perspective view another cutout of the adjusting device 100 according to FIG. 1. The detent fitting axis 123 is coupled with the backrest actuating arrangement 110a. For this, the backrest actuating arrangement 110a has a gear 150 rotatable or respectively rotatably mounted about its rotation axis 130. The gear 150 comprises a lever unit 151, a cam 153, a detent fitting lever 155 and a movement limitation 157. Here, the gear 150 is constructed as a cam mechanism 150a, in order to ensure a suitable force transmission to the detent fitting arrangement 120.

The lever unit 151 is mounted by a first end 151a rotatably about the rotation axis 130. The other end 151b projects radially away from the rotation axis 130. In this way, a lever arm is realized for an improved force or respectively moment transmission.

The cam 153 is connected with the first end 151a of the lever unit 151. The cam 153 has a first end 153a (see FIG. 9), by which the cam 153 is, on the one hand, mounted rotatably about the rotation axis 130, and on the other hand is coupled by the first end 153a with the lever unit 151. A movement of the lever unit 151 is thus transmitted to the cam 153, so that the latter also carries out a movement. The other end of the cam 153 is coupled loosely with the detent fitting lever 155. The detent fitting lever 155 is arranged by a first end 155a (see FIG. 9) in a torque-proof manner on the detent fitting axis 123. By the second end 155b (see FIG. 9), the detent fitting lever 155 is coupled loosely with the second end 153b of the cam 153. Hereby, a force applied onto the lever unit 151 can be transmitted in a translated manner via the cam 153 to the detent fitting lever 155. In order to limit a movement of the actuating arrangement 110, the movement limitation 157 is provided. In the example embodiment which is shown, this is partially integrated into the cam 153. The movement limitation 157 comprises a groove formed in the cam 153 or respectively an elongated hole 157a formed in the cam 153 (see FIG. 9). In addition, the movement limitation 157 comprises a pin 157b (see FIG. 9), which cooperates with the elongated hole 157a. The pin 157b is arranged in a stationary manner on the sitting part 20 and projects into the elongated hole 157a. Thereby, a movement of the cam 153 and hence of the actuating arrangement 110a through the elongated hole 157b is limited.

FIG. 4 shows diagrammatically in a perspective view a covered adjusting device 100. For protection and for visual reasons, the adjusting device 100 is covered by a covering 160. Only the corresponding levers of the actuating arrangements 110a, 110b project out from the covering 160. The levers have here at their projecting ends respectively a grip part 151c. By the latter, an ergonomic and/or secure gripping or respectively operating of the actuating arrangements 110a, 110b is ensured.

Figures 5, 6:
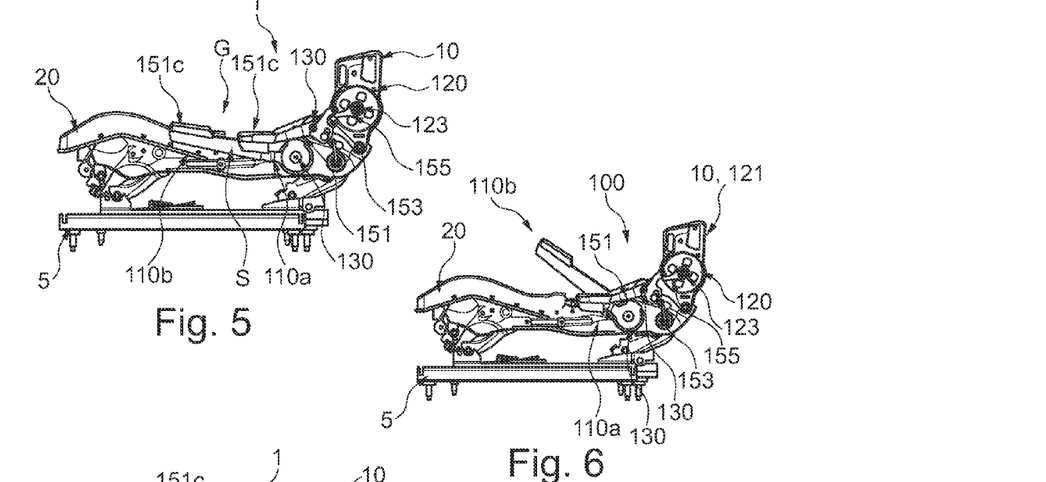
FIG. 5 is diagrammatically in a side view the adjusting device in an initial position.
FIG. 6 is diagrammatically in a side view the adjusting device on an actuation of a vertical adjustment.
Figures 7, 8, 9:
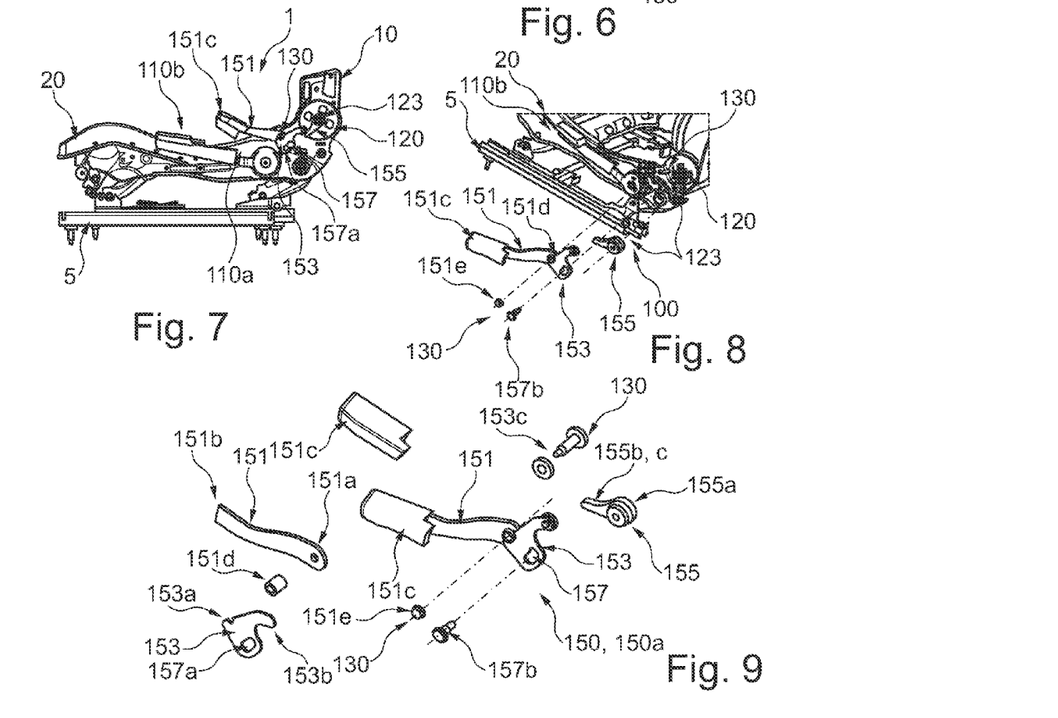
FIG. 7 is diagrammatically in a side view the adjusting device on a backrest adjustment.
FIG. 8 is the adjustment device diagrammatically in an explosion-like perspective view.
FIG. 9 is diagrammatically in a perspective view the backrest actuating device in an assembled state and in an exploded view.

In FIGS. 5 to 7, various operating positions of the adjusting device 100 are illustrated.

FIG. 5 shows diagrammatically in a side view the adjusting device 100 in an initial position. FIG. 6 shows diagrammatically in a side view the adjusting device 100 on an actuation of a vertical adjustment of the motor vehicle seat 1. FIG. 7 shows diagrammatically in a side view the adjusting device 100 on a backrest adjustment of the motor vehicle seat 1.

In FIG. 5 the actuating arrangements 110 are situated in a position of rest and therefore in an initial position. The actuating arrangements 110 are pre-stressed or respectively limited with regard to movement, so that these always return into the initial position. The backrest actuating arrangement 110a projects radially from the rotation axis 130, so that the grip part 151c is arranged remote from the rotation axis 130 or respectively the detent fitting axis 123. Through the fact that the actuating arrangements 110a, 110b are arranged adjoining or respectively adjacent to one another, the user, for adjusting a backrest position, i.e. for folding a backrest part 10 (here only indicated diagrammatically) relative to the sitting part 20, does not have to change from the grip region G for adjusting the motor vehicle seat 1. The actuating arrangements 110a, 110b are arranged here so that these visually create the impression of a shared actuating arrangement 110 with two actuating sections. The actuating arrangements 110a, 110a have the lever unit 151, embodied as an elongated lever with grip part 151c, which are aligned with one another. This means that the seat actuating arrangement 110b lies in extension of the backrest actuating arrangement 110a. As illustrated, the actuating arrangements 110a, 110b or respectively their grip parts 151c are constructed aligned with one another. With the exception of a gap S, with a predetermined gap measurement, arranged between the actuating arrangements 110a, 110b for the separate actuation, the contours of the actuating arrangements 110a, 110b continue seamlessly into one another, at least on a surface which faces the user. In the example embodiment which is illustrated here, the gap measurement is about a few centimeters.

FIG. 6 shows the seat actuating arrangement 110b in a first actuating position. The backrest actuating arrangement 110a is situated in the initial position. The seat actuating arrangement 110b is movable both in the direction of the motor vehicle floor, which is not illustrated here, and also in an opposite direction, towards a user. The movement is limited for example by a stop. In the position which is illustrated here, the seat actuating arrangement 110b is moved towards the user for a raising of the sitting part 20, i.e. is rotated in a clockwise direction about the corresponding rotation axis 130.

FIG. 7 shows the backrest actuating arrangement 110a in an actuation position. The backrest actuating arrangement 110a is constructed so as to be movable for an adjustment in a direction to the user, i.e. away from a motor vehicle floor. For adjusting the backrest or the backrest part 10, the backrest actuating arrangement 110a is drawn to the user, as illustrated in FIG. 7. In this position, the backrest 10 is adjustable, i.e. the backrest adjusting device 110a is unlocked. The seat actuating arrangement 110b is situated in an initial position.

FIG. 8 shows the adjusting device 100 diagrammatically in an explosion-like perspective view. The backrest adjusting device 110a has the lever unit 151 with the grip part 151c at the second end 151b. At the other, first end 151a a bush 151d is constructed for the rotatable arrangement about the rotation axis 130a. The cam 153 is connected around the bush 151d in a torque-proof manner with the lever unit 151 by the first end 153a. The bush 151d is connected with the lever unit 151 via a nut or a rivet 151e. The cam 153 has the elongated hole 157a for rotation limitation. The pin 157b or suchlike is arranged through the elongated hole 157a along an axis, for the formation of the movement limitation 157. The rolling part 153c is provided at the second end 153b of the cam 153. This cooperates loosely with the rolling surface 155c of the detent fitting lever 155, which is formed at the second end of the detent fitting lever 155. At the first end 155a, the detent fitting lever 155 is connected in a torque-proof manner with the detent fitting axis 123, so that a rotating of the detent fitting lever 123 brings about a rotating of the detent fitting axis 123. The structure of the backrest actuating arrangement 110a is illustrated in more detail in FIG. 9.

FIG. 9 shows diagrammatically in a perspective view the backrest actuating device 110a in an assembled state and in an exploded view. Accordingly, the backrest actuating arrangement 110a comprises the lever unit 151, constructed as a lever. The grip unit 151c is fastened thereon at the second end 151b. At the other, first end 151a a bearing site is constructed with the bush 151d. The latter is placed onto the rotation axis 130, which is constructed in an integrated manner with the screw connecting means 141, and is then riveted with the rivet or respectively the nut 151e, so that the lever is arranged rotatably about the rotation axis 130. The cam 153 is connected with the bush 151d and the lever. The pin 157b is inserted through the curved elongated hole 157a formed in the cam 153. This pin is connected with the sitting part 20 and thus forms the movement limitation 157 with the elongated hole 157a. In addition, the cam 153 has the rolling part 153c, which is constructed as a bush riveted with the cam 153. The rolling part 153c is arranged so that it rests on the rolling surface 155c of the detent fitting lever 155.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An adjusting device for multiple adjusting of a backrest part relative to a sitting part of a motor vehicle seat, comprising:
   a discontinuous detent fitting arrangement connected in a stationary manner with the sitting part via at least one connecting means, the at least one connecting means constructed as at least one screw connecting means and the at least one screw connecting means has a thread-free shaft for the formation of at least one rotation axis; and
   at least one actuating arrangement rotatable about the at least one rotation axis for actuating the detent fitting arrangement, the at least one actuating arrangement having a gear which is rotatable about the at least one rotation axis, the gear having a lever unit, which is mounted by a first end rotatably about the at least one rotation axis, the lever unit having a second end with a grip part and the gear having a cam, which is connected at a first end in a torque-proof manner with the lever unit,
   wherein the at least one rotation axis is constructed in an integrated manner with the at least one connecting means and the gear has a detent fitting lever, rotatable about a detent fitting axis, in order to rotate the detent fitting axis via the detent fitting lever and to release or to lock the detent fitting arrangement.

2. The adjusting device according to claim 1, wherein the cam has a rolling part, in order to roll along the detent fitting lever.

3. The adjusting device according to claim 2, wherein the detent fitting lever has a rolling surface corresponding to the rolling part.

4. The adjusting device according to claim 3, wherein the detent fitting lever is pre-stressed, so that it is able to be moved back into an initial position.

5. The adjusting device according to claim 4, wherein the at least one actuating arrangement has a movement limitation, in order to limit its movement.

6. A motor vehicle seat, comprising:
   an adjustable sitting part; and
   a backrest part which is adjustable with respect to the sitting part, including at least one adjusting arrangement for adjusting at least one of the backrest part and the sitting part, the adjusting arrangement including:
      a discontinuous detent fitting arrangement connected in a stationary manner with the sitting part via at least one connecting means, the at least one connecting means constructed as at least one screw connecting means and the at least one screw connecting means has a thread-free shaft for the formation of at least one rotation axis; and
      at least one actuating arrangement rotatable about the at least one rotation axis for actuating the detent fitting arrangement, the at least one actuating arrangement having a movement limitation to limit its movement, the at least one actuating arrangement including a gear which is rotatable about the at least one rotation axis, the gear having a detent fitting lever, rotatable about a detent fitting axis, in order to rotate the detent fitting axis via the detent fitting lever and to release or to lock the detent fitting arrangement,
      wherein the at least one rotation axis is constructed in an integrated manner with the at least one connecting means.

7. The motor vehicle seat according to claim 6, wherein the gear has a lever unit, which is mounted by a first end rotatably about the at least one rotation axis.

8. A motor vehicle, comprising:
   a motor vehicle seat having an adjustable sitting part, a backrest part which is adjustable with respect to the sitting part, and at least one adjusting arrangement for adjusting at least one of the backrest part and the sitting part, the adjusting arrangement including:
      a discontinuous detent fitting arrangement connected in a stationary manner with the sitting part via at least one connecting means, the at least one connecting means constructed as at least one screw connecting means and the at least one screw connecting means has a thread-free shaft for the formation of at least one rotation axis; and
      at least one actuating arrangement including a gear which is rotatable about the at least one rotation axis for actuating the detent fitting arrangement, the gear having a detent fitting lever, rotatable about a detent fitting axis, in order to rotate the detent fitting axis via the detent fitting lever and to release or to lock the detent fitting arrangement,
      wherein the at least one rotation axis is constructed in an integrated manner with the at least one connecting means.

9. The motor vehicle according to claim 8, wherein the gear has a lever unit, which is mounted by a first end rotatably about the at least one rotation axis.

10. A method for mounting a motor vehicle seat with a backrest adjusting device with a discontinuous detent fitting arrangement for the multiple adjusting of a backrest part relative to a sitting part of the motor vehicle seat, comprising:
   connecting the detent fitting arrangement with the sitting part via connecting means, so that the detent fitting arrangement is connected in a stationary manner with the sitting part, the connecting means constructed as a screw connecting means and the screw connecting means has a thread-free shaft for the formation of a rotation axis;
   forming the rotation axis for the rotatable arranging of an actuating arrangement for actuating the detent fitting arrangement about the rotation axis, the actuating arrangement having a gear which is rotatable about the rotation axis and the gear has a detent fitting lever, rotatable about a detent fitting axis, in order to rotate the detent fitting axis via the detent fitting lever and to release or to lock the detent fitting arrangement,
wherein the rotation axis is constructed in an integrated manner with the connecting means.

* * * * *